(12) United States Patent
Shoji et al.

(10) Patent No.: US 8,297,120 B2
(45) Date of Patent: Oct. 30, 2012

(54) ANGULAR VELOCITY SIGNAL DETECTION CIRCUIT AND ANGULAR VELOCITY SIGNAL DETECTION METHOD

(75) Inventors: Kohei Shoji, Kyoto-fu (JP); Takaaki Fuchikami, Kyoto-fu (JP)

(73) Assignee: Rohm Co., Ltd., Kyoto-fu (JP)

( * ) Notice: Subject to any disclaimer, the term of this patent is extended or adjusted under 35 U.S.C. 154(b) by 416 days.

(21) Appl. No.: 12/674,992

(22) PCT Filed: Aug. 28, 2008

(86) PCT No.: PCT/JP2008/065377
§ 371 (c)(1),
(2), (4) Date: Feb. 24, 2010

(87) PCT Pub. No.: WO2009/028594
PCT Pub. Date: Mar. 5, 2009

(65) Prior Publication Data
US 2011/0107836 A1    May 12, 2011

(30) Foreign Application Priority Data

Aug. 31, 2007  (JP) ............................ 2007-225057
Sep. 3, 2007    (JP) ............................ 2007-227618

(51) Int. Cl.
*G01C 19/00* (2006.01)
(52) U.S. Cl. .................................................. 73/504.12
(58) Field of Classification Search ............... 73/504.02, 73/510, 504.12, 514.02
See application file for complete search history.

(56) References Cited

U.S. PATENT DOCUMENTS

| | | | |
|---|---|---|---|
| 4,671,112 A * | 6/1987 | Kimura et al. ............. | 73/504.16 |
| 4,764,244 A | 8/1988 | Chitty et al. | |
| 5,052,225 A * | 10/1991 | Ishii ........................... | 73/504.05 |
| 5,136,159 A * | 8/1992 | Nakazawa et al. ........... | 250/230 |
| 5,648,608 A | 7/1997 | Nakamura | |
| 5,987,987 A * | 11/1999 | Watarai ...................... | 73/504.16 |
| 6,089,089 A | 7/2000 | Hsu | |
| 6,282,957 B1 * | 9/2001 | Akimoto et al. ............ | 73/504.12 |
| 6,465,771 B2 * | 10/2002 | Ohsawa .................... | 250/231.12 |
| 6,578,420 B1 | 6/2003 | Hsu | |
| 6,586,725 B2 * | 7/2003 | Mizutani et al. ......... | 250/227.28 |
| 6,907,784 B2 * | 6/2005 | Kato .......................... | 73/514.15 |
| 7,197,930 B2 * | 4/2007 | Sugiki et al. ............... | 73/504.12 |
| 7,246,512 B2 * | 7/2007 | Schroeder ..................... | 73/1.77 |
| 7,249,488 B2 * | 7/2007 | Schroeder ..................... | 73/1.77 |
| 7,263,884 B2 | 9/2007 | Takahashi et al. | |

(Continued)

FOREIGN PATENT DOCUMENTS

JP    63-500068    1/1988

(Continued)

*Primary Examiner* — Peter Macchiarolo
*Assistant Examiner* — Samir M Shah
(74) *Attorney, Agent, or Firm* — Fish & Richardson P.C.

(57) ABSTRACT

An angular velocity signal detection circuit includes: a first current-voltage conversion circuit that converts, into a voltage, a current outputted from a first detection electrode of a gyroscope, and amplifies the voltage, thereby outputs a first conversion signal; a second current-voltage conversion circuit that converts, into a voltage, a current outputted from a second detection electrode of the gyroscope, and amplifies the voltage, thereby outputs a second conversion signal; an arithmetic operation unit that performs arithmetic operations by using the first conversion signal and the second conversion signal, and outputs a first processing signal and a second processing signal; and a third difference arithmetic operation circuit that amplifies a difference between the first processing signal and the second processing signal.

9 Claims, 7 Drawing Sheets

U.S. PATENT DOCUMENTS

| | | |
|---|---|---|
| 7,300,854 B2 | 11/2007 | Benzel et al. |
| 7,441,458 B2 * | 10/2008 | Yokoi et al. ............... 73/504.12 |
| 7,523,665 B2 * | 4/2009 | Katsumata et al. ......... 73/514.32 |
| 2001/0015406 A1 * | 8/2001 | Ohsawa .................... 250/231.12 |
| 2004/0065931 A1 | 4/2004 | Benzel et al. |
| 2004/0177690 A1 * | 9/2004 | Kato ............................ 73/514.15 |
| 2004/0187577 A1 | 9/2004 | Higuchi et al. |
| 2011/0041601 A1 * | 2/2011 | Hsu et al. .................... 73/504.08 |

FOREIGN PATENT DOCUMENTS

| | | |
|---|---|---|
| JP | 03-15712 | 1/1991 |
| JP | 08-114456 | 5/1996 |
| JP | 09061174 A * | 3/1997 |
| JP | 09-178492 | 7/1997 |
| JP | 11-63999 | 3/1999 |
| JP | 11-69787 | 3/1999 |
| JP | 3201135 | 8/2001 |
| JP | 2001-520385 | 10/2001 |
| JP | 2004-525352 | 8/2004 |
| JP | 2004-279101 | 10/2004 |
| JP | 2004-317484 | 11/2004 |
| JP | 2005-227110 | 8/2005 |
| JP | 2005-291858 | 10/2005 |
| JP | 2006-105896 | 4/2006 |

* cited by examiner (A)

(B)

(C)

ANGULAR VELOCITY SIGNAL DETECTION CIRCUIT AND ANGULAR VELOCITY SIGNAL DETECTION METHOD

TECHNICAL FIELD

The present invention relates to an angular velocity signal detection circuit and an angular velocity signal detection method, and particularly relates to an angular velocity signal detection circuit and an angular velocity signal detection method, which detect a minute angular velocity signal outputted from a gyroscope.

BACKGROUND ART

A gyroscope is known as a sensor that detects a rotational angular velocity. A gyroscope that uses a vibrator is called a vibration gyroscope, and the range of uses thereof is wide. For example, the vibration gyroscope is used for sensing camera shake in a video camera, a digital still camera or the like, sensing a direction in a navigation system, sensing an attitude of a mobile unit such as an automobile and an aircraft, and so on.

As signal components outputted from the vibrator of the vibration gyroscope, there are: a drive signal that drives the vibrator; and an angular velocity signal caused by Coriolis force. There is a phase difference of 90 degrees between the drive signal and the angular velocity signal. In the case where an angular velocity occurs in the vibrator, a phase difference between the drive signal and an angular velocity signal outputted from one of two detection electrodes of the vibrator is +90 degrees, and a phase difference between the drive signal and an angular velocity signal outputted from the other is −90 degrees. In the following Patent Citation 1, a vibration gyro circuit, a vibration gyro unit and a vibration gyro output detection method are disclosed, which take a difference between the angular velocity signal outputted from one of the two detection electrodes and the angular velocity signal outputted from the other, and only detect an angular velocity signal thus obtained.

[Patent Citation 1] Japanese Patent Laid-Open Publication No. 2006-105896

DISCLOSURE OF INVENTION

[Technical Problem]

In the vibration gyro circuit, the vibration gyro unit and the vibration gyro output detection method, which are disclosed in Patent Citation 1 mentioned above, the following points are not taken into consideration. A signal amount of the angular velocity signal outputted from the vibrator is minute, and an S/N ratio thereof is also poor. Such an angular velocity signal is buried in a drive signal remaining as a result that the above-described drive signal cannot be completely removed by the difference between the angular velocity signals outputted from the two detection electrodes of the vibrator, and it is difficult to detect the angular velocity signal.

Moreover, even if the minute angular velocity signal is amplified, the drive signal is also amplified together therewith. Accordingly, if a difference in signal amount between the amount of the angular velocity signal and an amount of the drive signal is large, then it is difficult to detect the angular velocity signal.

The present invention has been made in order to solve the above-described problems. The present invention provides an angular velocity signal detection circuit and an angular velocity signal detection method, which are capable of easily detecting the angular velocity signal with the minute signal amount.

[Technical Solution]

In accordance with an aspect of the present invention, there is provided an angular velocity signal detection circuit including: (A) a first current-voltage conversion circuit that converts, into a voltage, a current outputted from a first detection electrode of a gyroscope, and amplifies the voltage, thereby outputs a first conversion signal; (B) a second current-voltage conversion circuit that converts, into a voltage, a current outputted from a second detection electrode of the gyroscope, and amplifies the voltage, thereby outputs a second conversion signal; (C) an arithmetic operation unit that performs arithmetic operations by using the first conversion signal and the second conversion signal, and outputs a first processing signal and a second processing signal; and (D) a difference arithmetic operation circuit that amplifies a difference between the first processing signal and the second processing signal.

In accordance with another aspect of the present invention, there is provided an angular velocity signal detection method including: (A converting a current outputted from a first detection electrode of a gyroscope into a voltage, and amplifying the voltage, thereby generating a first conversion signal; (B) converting a current outputted from a second detection electrode of the gyroscope into a voltage, and amplifying the voltage, thereby generating a second conversion signal; (C) performing arithmetic operations by using the first conversion signal and the second conversion signal, and outputting a first processing signal and a second processing signal; and (D) amplifying a difference between the first processing signal and the second processing signal.

[Advantageous Effects]

In accordance with the present invention, the angular velocity signal detection circuit and the angular velocity signal detection method, which are capable of easily detecting the angular velocity signal with the minute signal amount, can be provided.

BEST MODE FOR CARRYING OUT THE INVENTION

Figure 1:
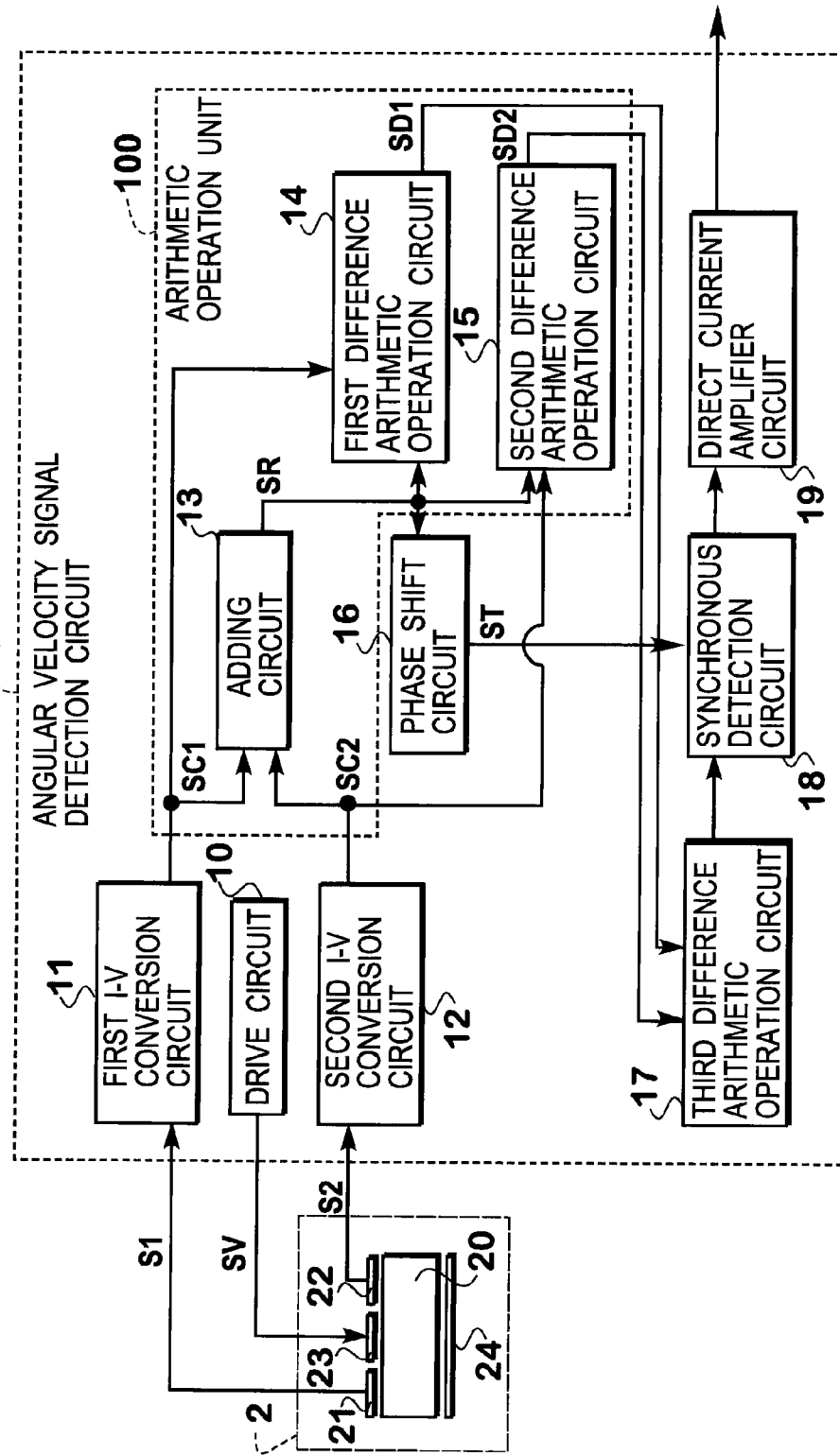
FIG. 1 is a block configuration diagram showing an angular velocity signal detection circuit and an angular velocity signal detection system according to a first embodiment of the present invention.

Next, a description will be made of first and second embodiments of the present invention with reference to the drawings. In the following description referring to the drawings, the same or similar reference numerals are assigned to the same or similar portions. Note that the drawings are schematic, and are different from the actual things. Moreover, portions in which mutual dimensional relationships and ratios are different from one another are also incorporated among the drawings. Moreover, the first and second embodiments, which will be shown below, illustrate an apparatus and a method for embodying the technical idea of this invention, and the technical idea of this invention does not specify arrangement of the respective constituent components, and the like to the following ones. A variety of alternations can be added to the technical idea of this invention within the scope of claims.

(First Embodiment)

The first embodiment of the present invention describes an example where the present invention is applied to an angular velocity signal detection circuit connected to a gyroscope using a vibrator, that is, a vibration gyro. Here, a beam gyroscope is used.

[Configuration of Angular Velocity Signal Detection Circuit]

As shown in FIG. 1, an angular velocity signal detection circuit 1 includes: a first current-voltage conversion circuit (I-V conversion circuit) 11 that converts a current outputted from a first detection electrode 21 into a voltage, and amplifies the voltage, thereby outputs a first conversion signal SC1; a second current-voltage conversion circuit (I-V conversion circuit) 12 that converts a current outputted from a second detection electrode 22 into a voltage, and amplifies the voltage, thereby outputs a second conversion signal SC2; an arithmetic operation unit 100 that performs arithmetic operations by using the first conversion signal SC1 and the second conversion signal SC2, and outputs a first processing signal SD1 and a second processing signal SD2; and a third difference arithmetic operation circuit 17 that amplifies a difference between the first processing signal SD1 and the second processing signal SD2.

As shown in FIG. 1, the first current-voltage conversion circuit 11 is connected to the first detection electrode 21 of a gyroscope 2, and receives a first detection signal S1 outputted from the first detection electrode 21. The second current-voltage conversion circuit 12 is connected to the second detection electrode 22 of the gyroscope 2, and receives a second detection signal S2 from the second detection electrode 22.

The arithmetic operation unit 100 shown in FIG. 1 includes: an adding circuit 13; a first difference arithmetic operation circuit 14; and a second difference arithmetic operation circuit 15. The adding circuit 13 adds the second conversion signal SC2 to the first conversion signal SC1, and generates a reference signal SR. The first difference arithmetic operation circuit 14 generates the first difference signal SD1 by a difference arithmetic operation between the first conversion signal SC1 and the reference signal SR, and outputs the first difference signal SD1 as a first processing signal SD1. The second difference arithmetic operation circuit 15 generates the second difference signal SD2 by a difference arithmetic operation between the second conversion signal SC2 and the reference signal SR, and outputs the second difference signal SD2 as a second processing signal SD2.

The angular velocity signal detection circuit 1 according to the first embodiment further includes: a phase shift circuit 16; a synchronous detection circuit 18; and a direct current amplifier circuit 19. The phase shift circuit 16 generates a timing signal ST for synchronous detection from the reference signal SR outputted from the adding circuit 13. The synchronous detection circuit 18 converts an alternating current signal, which is outputted from the third difference arithmetic operation circuit 17, into a direct current signal by synchronizing the alternating current signal with the timing signal ST, and outputs the direct current signal obtained by the conversion. The direct current amplifier circuit 19 amplifies the output of the synchronous detection circuit 18.

The angular velocity signal detection circuit 1 further includes a drive circuit 10 connected to a drive electrode 23 of the gyroscope 2. In the first embodiment, the gyroscope 2 and the angular velocity signal detection circuit 1 that detects and amplifies an angular velocity signal outputted from the gyroscope 2 construct an angular velocity signal detection system that detects an angular velocity.

Figure 2:
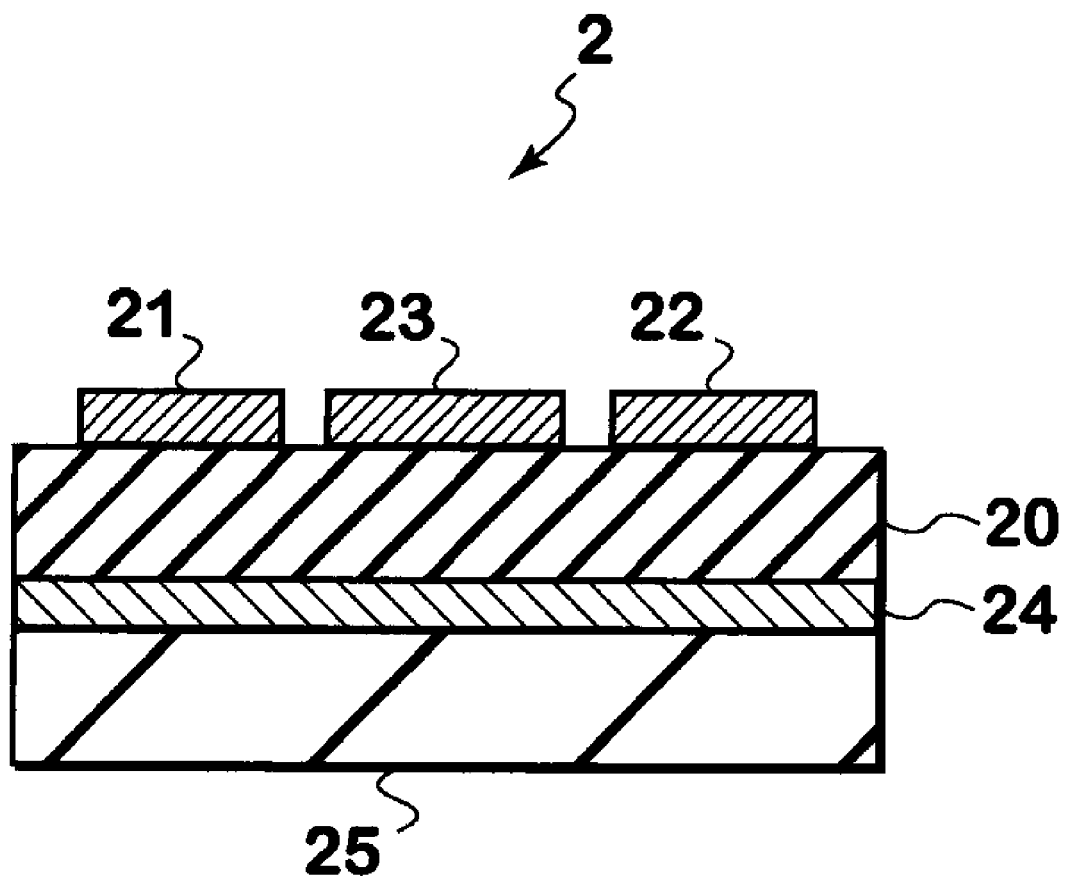
FIG. 2 is a cross-sectional view of a gyroscope shown in FIG. 1.

In the first embodiment, the gyroscope 2 is a thin film vibration gyroscope. As shown in FIG. 2, the gyroscope 2 includes: a vibrator 20; the first detection electrode (upper electrode) 21 arranged on a left side in the drawing on the vibrator 20; the second detection electrode (upper electrode) 22 arranged on a right side in the drawing on the vibrator 20; the drive electrode (upper electrode 23) arranged on a center in the drawing on the vibrator 20; a back surface electrode (lower electrode) 24 arranged on the whole region under the vibrator 20; and an insulator 25 arranged on the whole region under the back surface electrode 24. For the vibrator 20, for example, a piezoelectric thin film such as a lead zirconate titanate (PZT) film can be used. The back surface electrode 24 is grounded.

Moreover, the gyroscope 2 is manufactured by using a semiconductor manufacturing process, and may be built on a silicon substrate by a micro electromechanical systems (MEMS) structure. Though not particularly illustrated, the gyroscope 2 is a beam gyroscope composed into a cantilever shape on a silicon substrate.

The first current-voltage conversion circuit 11 of the angular velocity signal detection circuit 1 shown in FIG. 1 converts, into a voltage, an alternating current outputted as the first detection signal S1 from the first detection electrode 21 when Coriolis force is applied to the gyroscope 2, and amplifies the voltage obtained by the conversion. The second current-voltage conversion circuit 12 converts, into a voltage, an alternating current outputted as the second detection signal S2 from the second detection electrode 22 when the Coriolis force is applied to the gyroscope 2, and amplifies the voltage obtained by the conversion.

The adding circuit 13 adds the first conversion signal SC1, which the first current-voltage conversion circuit 11 generates by amplifying the first detection signal S1 after performing such current-voltage conversion therefor, and the second conversion signal SC2, which the second current-voltage conversion circuit 12 generates by amplifying the second detection signal SC2 after performing such current-voltage conversion therefor, to each other. A signal obtained by adding the first conversion signal SC1 and the second conversion signal SC2 to each other is used as the reference signal SR in each of the first difference arithmetic operation circuit 14 and the second difference arithmetic operation circuit 15.

The first difference arithmetic operation circuit 14 performs a difference arithmetic operation between the first conversion signal SC1 outputted from the first current-voltage conversion circuit 11 and the reference signal SR generated by the adding circuit 13 and outputted therefrom. By the difference arithmetic operation in the first difference arithmetic operation circuit 14, a signal other than the angular velocity signal, which is contained in the signal inputted to the first difference arithmetic operation circuit 14, that is, noise (carrier noise) can be reduced. The second difference arithmetic operation circuit 15 performs a difference arithmetic operation between the second conversion signal SC2 outputted from the second current-voltage conversion circuit 12 and the reference signal SR generated by the adding circuit 13 and outputted therefrom. By the difference arithmetic operation in the second difference arithmetic operation circuit 15, a signal other than the angular velocity signal, which is contained in the signal inputted to the second difference arithmetic operation circuit 15, that is, noise (carrier noise) can be reduced.

The third difference arithmetic operation circuit 17 performs a difference arithmetic operation between the first difference signal SD1, which is outputted from the first difference arithmetic operation circuit 14 and has the noise reduced therefrom, and the second difference signal SD2, which is outputted from the second difference arithmetic operation circuit 15 and has the noise reduced therefrom. In such a way, the third difference arithmetic operation circuit 17 further reduces noise contained in such signals inputted to the third difference arithmetic operation circuit 17, that is, can enhance an S/N ratio of the signal.

The phase shift circuit 16 generates the timing signal ST with a square wave shape, which is phase-shifted from the reference signal SR outputted from the adding circuit 13. This timing signal ST is used as a timing signal for the synchronous detection in the synchronous detection circuit 18.

The synchronous detection circuit 18 performs full-wave rectification for the alternating current signal outputted from the third difference arithmetic operation circuit 17 in synchronization with the timing signal ST generated by the phase shift circuit 16. Then, the synchronous detection circuit 18 integrates (or smoothes) the signal subjected to the full-wave rectification, and converts the signal concerned into a signal as a direct current signal. In other words, the synchronous detection circuit 18 generates an angular velocity signal that is the direct current signal and has the noise reduced sufficiently therefrom.

[Angular Velocity Signal Detection Method]

Next, a description will be made of an angular velocity signal detection method using the angular velocity signal detection circuit 1 shown in FIG. 1.

When the angular velocity occurs in the vibrator 20 of the gyroscope 2, the first detection signal S1 is outputted from the first detection electrode 21 of the gyroscope 2 by the Coriolis force. The angular velocity signal contained in the first detection signal S1 has a phase difference of +90 degrees with respect to a drive signal SV supplied from the drive circuit 10. The first detection signal S1 is represented by Expression (1):

$$S1 = \sin(\alpha) + \cos(\beta) \quad (1)$$

In Expression (1), $\sin(\alpha)$ is the noise (carrier noise), and $\cos(\beta)$ is the angular velocity signal.

Moreover, the second detection signal S2 is outputted from the second detection electrode 22 of the gyroscope 2. The angular velocity signal contained in the second detection signal S2 has a phase difference of −90 degrees with respect to the drive signal SV supplied from the drive circuit 10. The second detection signal S2 is represented by Expression (2):

$$S2 = \sin(\alpha) - \cos(\beta) \quad (2)$$

Ideally, if a difference between the first detection signal S1 and the second detection signal S2 is taken, then as shown in Expression (3), the noise is removed, and the angular velocity signal can be taken out:

$$S1 - S2 = 2 \times \cos(\beta) \quad (3)$$

Actually, such extraction of the angular velocity signal is affected by performance of an operational amplifier that performs the difference arithmetic operation, and as shown in Expression (4), the noise cannot be sufficiently taken off, and the noise cannot be removed:

$$S1 - S2 = (1/x)\sin(\alpha) + 2 \times \cos(\beta) \quad (4)$$

The first term of the right side in Expression (4) is the noise that cannot be completely taken off by the difference arithmetic operation. The noise $((1/x)\sin(\alpha))$ is larger than the angular velocity signal $(2 \times \cos(\beta))$ $((1/x)\sin(\alpha) \gg 2 \times \cos(\beta))$.

The first detection signal S1 outputted from the first detection electrode 21 of the gyroscope 2 is converted into the voltage in the first current-voltage conversion circuit 11, and the voltage thus obtained by the conversion is amplified, whereby the first conversion signal SC1 is generated. In a similar way, the second detection signal S2 outputted from the second detection electrode 22 is converted into the voltage in the second current-voltage conversion circuit 12, and the voltage thus obtained by the conversion is amplified, whereby the second conversion signal SC2 is generated. The first conversion signal SC1 and the second conversion signal SC2 are added to each other in the adding circuit 13 as shown in Expression (5). Then, the reference signal SR shown in Expression (6) is generated in the adding circuit 13:

$$SC1 + SC2 = 2 \times \sin(\alpha) \quad (5)$$

$$SR = (SC1 + SC2)/2 = \sin(\alpha) \quad (6)$$

As shown in Expression (7), the first difference arithmetic operation circuit 14 performs the difference arithmetic operation between the first conversion signal SC1 outputted from the first current-voltage conversion circuit 11 and the reference signal SR outputted from the adding circuit 13. In a similar way, as shown in Expression (8), the second difference arithmetic operation circuit 15 performs the difference arithmetic operation between the second conversion signal SC2 outputted from the second current-voltage conversion circuit 12 and the reference signal SR outputted from the adding circuit 13:

$$SC1 - SR = (1/x)\sin(\alpha) + \cos(\beta) \quad (7)$$

$$SC2 - SR = (1/x)\sin(\alpha) - \cos(\beta) \quad (8)$$

Specifically, in the first difference arithmetic operation circuit 14 and the second difference arithmetic operation circuit 15, first, the noise in the first detection signal S1 outputted from the first detection electrode 21 and the noise in the second detection signal S2 outputted from the second detection electrode 22 are added to each other, and the reference signal SR in which the noises are averaged is generated. Then, the noise in the first detection signal S1 is subtracted by the reference signal SR, and the noise in the first detection signal S1 is reduced. In a similar way, the noise in the second detection signal S2 is subtracted by the reference signal SR, and the noise in the second detection signal S2 is reduced.

As shown in Expression (9), the third difference arithmetic operation circuit 17 further performs the difference arithmetic operation between the first difference signal SD1 (=SC1−SR) arithmetically operated and outputted by the first difference arithmetic operation circuit 14 and the second difference signal SD2 (=SC2−SR) arithmetically operated and outputted by the second difference arithmetic operation circuit 15:

$$(SC1-SR)-(SC2-SR)=(1/\gamma x)\sin(\alpha)+2\cos(\beta) \quad (9)$$

The noise $(1/\gamma x)\sin(\alpha)$ is larger than the angular velocity signal $2\cos(\beta)$ $((1/\gamma x)\sin(\alpha)>2\cos(\beta))$. However, the difference between the noise $(1/x)\sin(\alpha)$ in the signal (SC1−SR) and the noise $(1/x)\sin(\alpha)$ in the signal (SC2−SR) is further taken, and accordingly, the noise $(1/\gamma x)\sin(\alpha)$ is far smaller than the above-mentioned noise $(1/x)\sin(\alpha)$. Hence, the S/N ratio is enhanced in the signal {(SC1−SR)−(SC2−SR)} outputted from the third difference arithmetic operation circuit 17. Note that, in the angular velocity signal detection circuit 1 according to the first embodiment, totally two stages of the difference arithmetic operations are implemented; however, three or more stages of the difference arithmetic operations may be implemented.

By the reference signal SR generated by the adding circuit 13, the phase shift circuit 16 generates the timing signal ST for the synchronous detection. The timing signal ST is outputted to the synchronous detection circuit 18. The synchronous detection circuit 18 synchronizes the angular velocity signal $2\cos(\beta)$, in which the S/N ratio is enhanced by the third difference arithmetic operation circuit 17, with the timing signal ST, and converts the angular velocity signal $2\cos(\beta)$ concerned into the direct current signal. The angular velocity signal converted by the synchronous detection circuit 18 is amplified by the direct current amplifier circuit 19, and is outputted from the angular velocity signal detection circuit 1.

In the angular velocity signal detection circuit 1 and the angular velocity signal detection method, which are configured as described above, the adding circuit 13 adds the first detection signal S1 and the second detection signal S2, which are outputted from the gyroscope 2, and generates the reference signal SR. By using the reference signal SR, the first difference arithmetic operation circuit 14 and the second difference arithmetic operation circuit 15 perform the difference arithmetic operations for the signals, and the difference arithmetic operations are performed plural times for these signals subjected to the difference arithmetic operations. As a result, the noise in the detection signal outputted from the gyroscope 2 can be sufficiently reduced, and accordingly, the angular velocity signal in which the noise is reduced can be taken out. In other words, the S/N ratio can be enhanced, and a permissible range where the angular velocity signal is amplified can be widened. Therefore, the angular velocity signal detection circuit 1 and the angular velocity signal detection method, which are capable of detecting the angular velocity signal with the minute signal amount easily and accurately, can be realized.

(Second Embodiment)
[Configuration of Angular Velocity Signal Detection Circuit]

Figure 3:
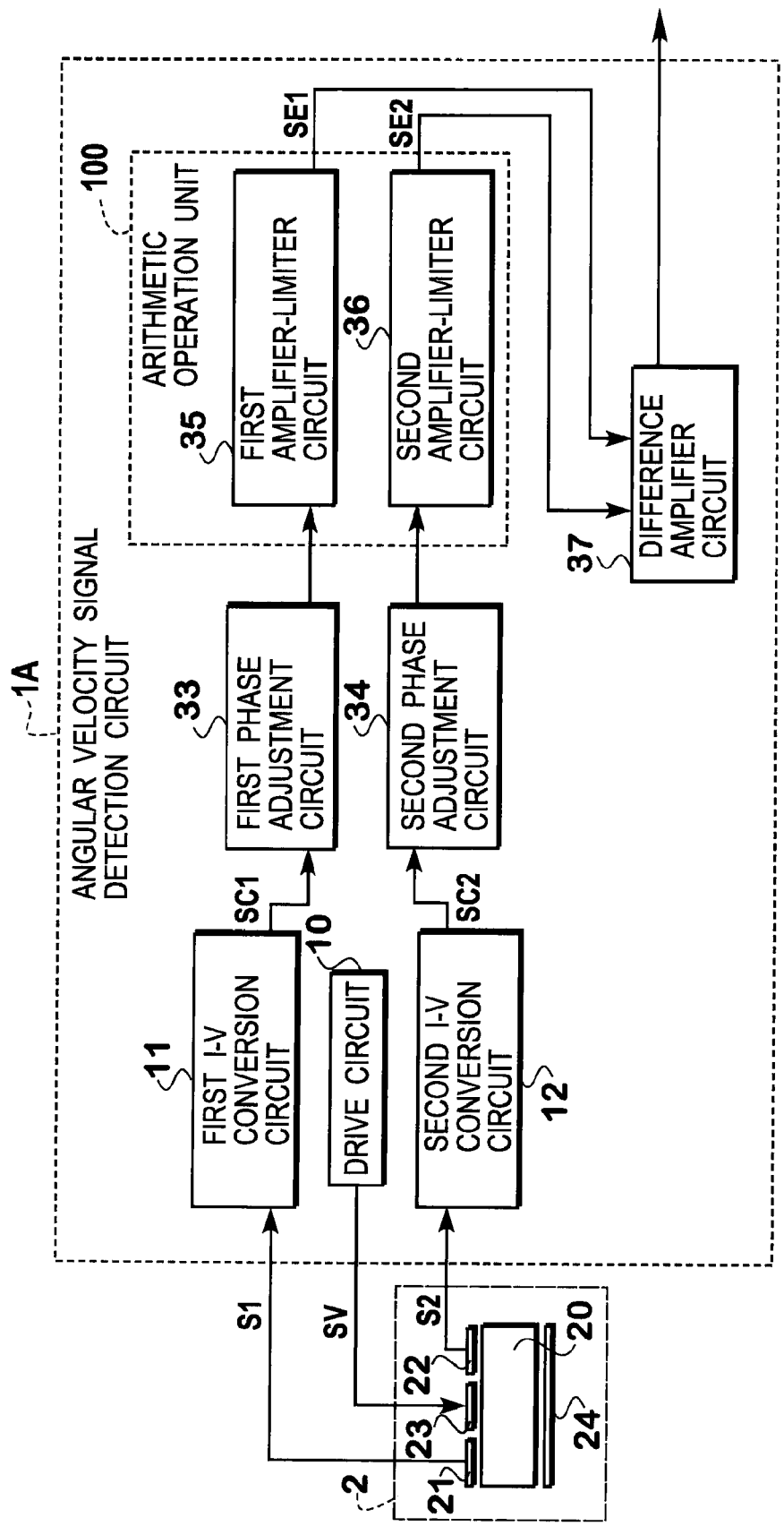
FIG. 3 is a block configuration diagram showing an angular velocity signal detection circuit and an angular velocity signal detection system according to a second embodiment of the present invention.

As shown in FIG. 3, an angular velocity signal detection circuit 1A according to a second embodiment includes: a first current-voltage conversion circuit 11 that converts the current outputted from the first detection electrode 21 into the voltage, and amplifies the voltage, thereby outputs a first conversion signal SC1; a second current-voltage conversion circuit 12 that converts the current outputted from the second detection electrode 22 into the voltage, and amplifies the voltage, thereby outputs a second conversion signal SC2; an arithmetic operation unit 100 that performs arithmetic operations by using the first conversion signal SC1 and the second conversion signal SC2, and outputs a first processing signal SE1 and a second processing signal SE2; and a difference amplifier circuit 37 that amplifies a phase difference between the first processing signal SE1 and the second processing signal SE2.

The arithmetic operation unit 100 shown in FIG. 3 includes: a first amplifier-limiter circuit 35; and a second amplifier-limiter circuit 36. The first amplifier-limiter circuit 35 amplifies the first conversion signal SC1 outputted from the first current-voltage conversion circuit 11 up to before saturation of the first conversion signal SC1, thereby generates a first amplification signal SE1, and outputs the first amplification signal SE1 as the first processing signal SE1. The second amplifier-limiter circuit 36 amplifies the second conversion signal SC2 outputted from the second current-voltage conversion circuit 12 up to before saturation of amplifies the second conversion signal SC2, thereby generates a second amplification signal SE2, and outputs the second amplification signal SE2 as the second processing signal SE2.

The angular velocity signal detection circuit 1A according to the second embodiment further includes: a first phase adjustment circuit 33 arranged between the first current-voltage conversion circuit 11 and the first amplifier-limiter circuit 35; and a second phase adjustment circuit 34 arranged between the second current-voltage conversion circuit 12 and the second amplifier-limiter circuit 36. The first phase adjustment circuit 33 adjusts a shift between a phase of the first detection signal S1 outputted from the first detection electrode 21 and a phase of the second detection signal S2 outputted from the second detection electrode 22. The second phase adjustment circuit 34 adjusts a shift between the phase of the first detection signal S1 outputted from the first detection electrode 21 and the phase of the second detection signal S2 outputted from the second detection electrode 22. Moreover, the angular velocity signal detection circuit 1A according to the second embodiment further includes the drive circuit 10 connected to the drive electrode 23 of the gyroscope 2.

In the second embodiment, the gyroscope 2 and the angular velocity signal detection circuit 1A that detects and amplifies the angular velocity signal outputted from the gyroscope 2 construct an angular velocity signal detection system that detects the angular velocity.

Figure 4:
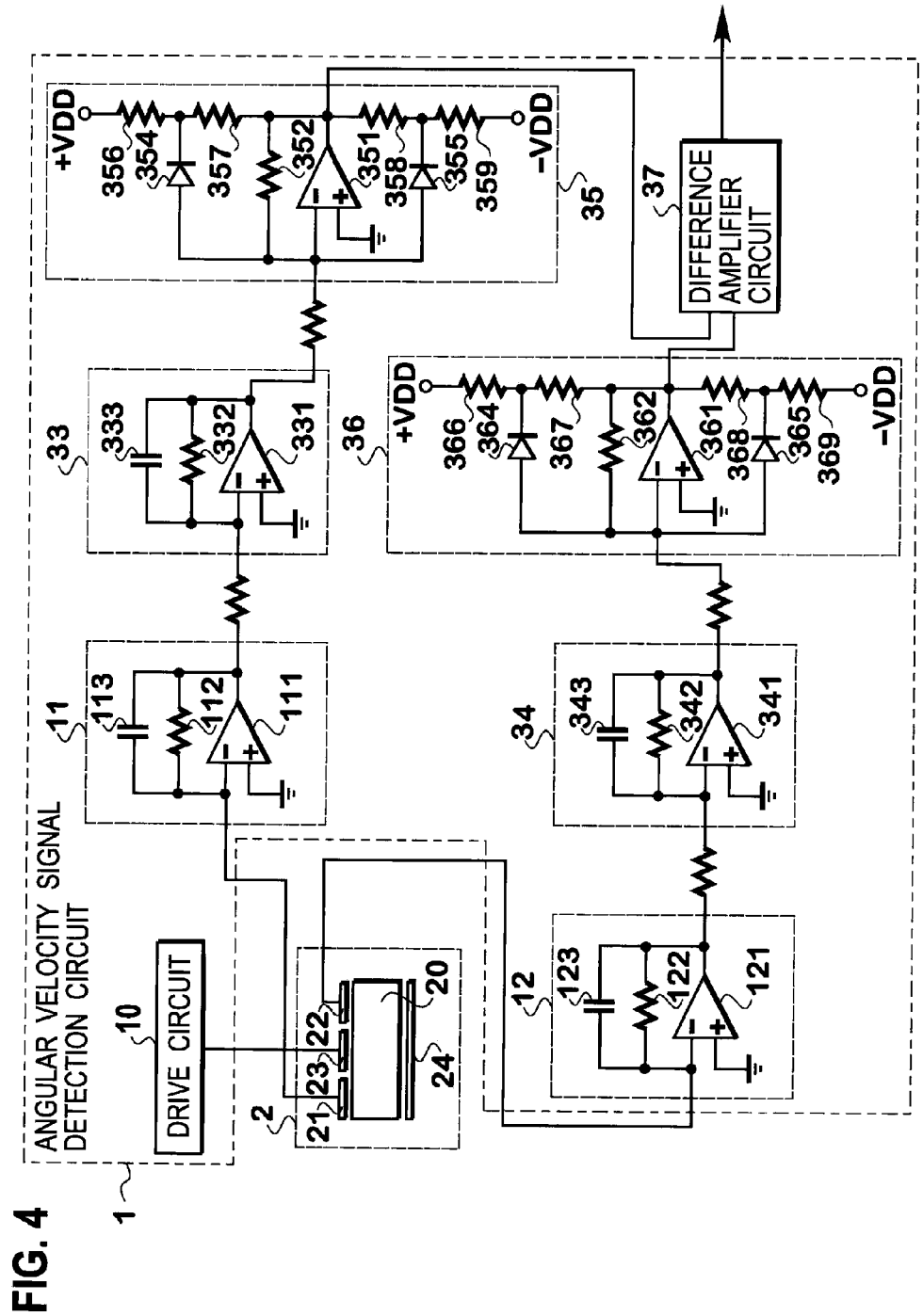
FIG. 4 is an example of a circuit diagram of the angular velocity signal detection circuit shown in FIG. 3.

The first current-voltage conversion circuit 11 shown in FIG. 3 converts, into the voltage, the alternating current as the first detection signal S1 outputted from the first detection electrode 21 when the Coriolis force is applied to the gyroscope 2, and amplifies the voltage obtained by the conversion. As shown in FIG. 4, the first current-voltage conversion circuit 11 includes: an operational amplifier 111; and a resistor 112 and a capacitor 113, which are connected electrically in parallel between an input and output of the operational amplifier 111.

The second current-voltage conversion circuit 12 converts, into the voltage, the alternating current as the second detection signal S2 outputted from the second detection electrode 22 when the Coriolis force is applied to the gyroscope 2, and amplifies the voltage obtained by the conversion. As shown in FIG. 4, the second current-voltage conversion circuit 12 includes: an operational amplifier 121; and a resistor 122 and a capacitor 123, which are connected electrically in parallel between an input and output of the operational amplifier 121.

The first phase adjustment circuit 33 and the second phase adjustment circuit 34 perform adjustment to allow the shifts between the phase of the first detection signal S1 outputted from the first detection electrode 21 and the phase of the second detection signal S2 outputted from the second detection electrode 22 to coincide with each other. Here, the shifts are caused by characteristics intrinsic to the vibrator 20 of the gyroscope 2. The first phase adjustment circuit 33 includes: an operational amplifier 331; and a resistor 332 and a capacitor 333, which are connected electrically in parallel between an input and output of the operational amplifier 331. The second phase adjustment circuit 34 includes: an operational amplifier 341; and a resistor 342 and a capacitor 343, which are connected electrically in parallel between an input and output of the operational amplifier 341.

As shown in FIG. 4, the first amplifier-limiter circuit 35 includes: an operational amplifier 351; a resistor 352 and a diode 354, which are connected electrically in parallel between an input and output of the operational amplifier 351 and between the output of the operational amplifier 351 and a power supply voltage VDD; a resistor 356 and a resistor 357, which are connected electrically in series between the output of the operational amplifier 351 and the power supply voltage VDD; a diode 355 connected electrically in parallel between the input and output of the operational amplifier 351 and between the output of the operational amplifier 351 and a power supply voltage −VDD; and a resistor 358 and a resistor 359, which are connected electrically in series between the output of the operational amplifier 351 and the power supply voltage −VDD. In the first amplifier-limiter circuit 35, a limiter value on a positive potential side is adjusted by a resistance division of the resistor 356 and the resistor 357, and a limiter value on a negative potential side is adjusted by a resistance division of the resistor 358 and the resistor 359.

Signal components of the first detection signal S1 outputted from the first detection electrode 21 are the drive signal and the angular velocity signal. If a difference in signal amount between an amount of the drive signal and an amount of the angular velocity signal, then the drive signal is first saturated, and at the point of time when the drive signal is saturated, the amplification reaches capacity. Moreover, when the drive signal is saturated, distortion occurs in the output, and in particular, in the angular velocity signal. In the first amplifier-limiter circuit 35, the output can be amplified without causing the distortion in an output waveform through a limiter function thereof.

The second amplifier-limiter circuit 36 includes: an operational amplifier 361; a resistor 362 and a diode 364, which are connected electrically in parallel between an input and output of the operational amplifier 361 and between the output of the operational amplifier 361 and the power supply voltage VDD; a resistor 366 and a resistor 367, which are connected electrically in series between the output of the operational amplifier 361 and the power supply voltage VDD; a diode 365 connected electrically in parallel between the input and output of the operational amplifier 361 and between the output of the operational amplifier 361 and the power supply voltage −VDD; and a resistor 368 and a resistor 369, which are connected electrically in series between the output of the operational amplifier 361 and the power supply voltage −VDD. In the second amplifier-limiter circuit 36, a limiter value on a positive potential side is adjusted by a resistance division of the resistor 366 and the resistor 367, and a limiter value on a negative potential side is adjusted by a resistance division of the resistor 368 and the resistor 369. In the second amplifier-limiter circuit 36, the output can be amplified without causing the distortion in an output waveform through a limiter function thereof in a similar way to the first amplifier-limiter circuit 35.

The difference amplifier circuit 37 takes a phase difference between the first amplification signal SE1 amplified without causing the distortion in the output waveform outputted from the first amplifier-limiter circuit 35 and the second amplification signal SE2 amplified without causing the distortion in the output waveform outputted from the second amplifier-limiter circuit 36, and amplifies this phase difference. This phase difference is a phase difference between the angular velocity signals. The first detection signal S1 outputted from the first detection electrode 21 of the gyroscope 2 and the second detection signal S2 outputted from the second detection electrode 22 thereof are amplified. Even if the amplified signals are saturated, the phase difference between the angular velocity signal outputted from the first detection electrode 21 and the angular velocity signal outputted from the second detection electrode 22 exits. In the angular velocity signal detection circuit 1A shown in FIG. 3, the signals amplified by the first amplifier-limiter circuit 35 and the second amplifier-limiter circuit 36 without distorting the output waveforms are inputted to the difference amplifier circuit 37. The difference amplifier circuit 37 takes out and amplifies the phase difference between the angular velocity signals in the amplified signals. Then, the signal in which the phase difference between the angular velocity signals is amplified is outputted from the angular velocity signal detection circuit 1A.

[Angular Velocity Signal Detection Method]

Next, a description will be made of an angular velocity signal detection method using the angular velocity signal detection circuit 1A shown in FIG. 3 and FIG. 4.

Figure 5:
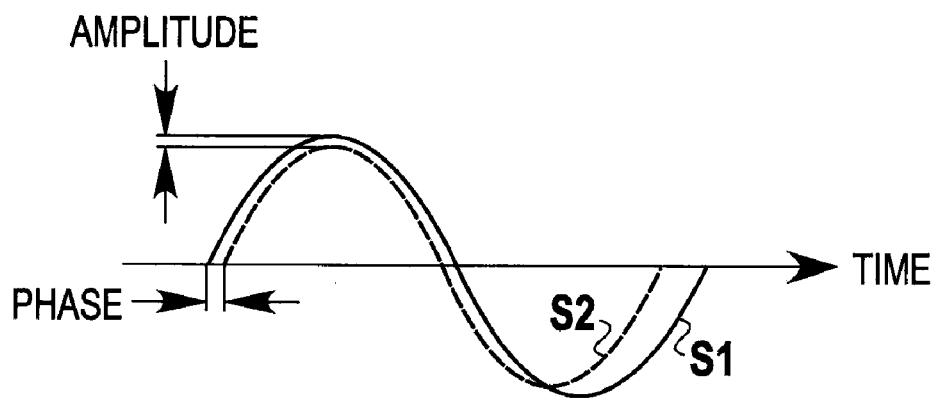
FIG. 5 is a waveform chart of signals outputted from a gyroscope shown in FIG. 3.

When the angular velocity occurs in the vibrator 20 of the gyroscope 2, as shown in FIG. 5, the first detection signal S1 is outputted from the first detection electrode 21 of the gyroscope 2 by the Coriolis force. In a similar way, the second detection signal S2 is outputted from the second detection electrode 22. The noise (carrier noise) and the angular velocity signal are contained in each of the signal component of the detection signal S1 and the detection signal S2.

The detection signal S1 outputted from the first detection electrode 21 of the gyroscope 2 is converted into the voltage in the first current-voltage conversion circuit 11, and the first detection signal S1 converted into the voltage is amplified. In a similar way, the second detection signal S2 outputted from the second detection electrode 22 is converted into the voltage in the second current-voltage conversion circuit 12, and the second detection signal S2 converted into the voltage is amplified.

Figure 6:
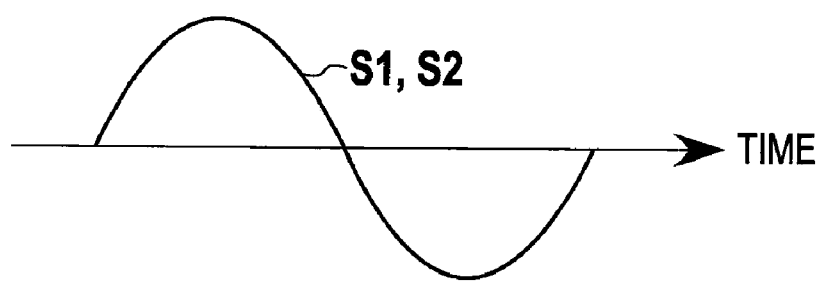
FIG. 6 is a waveform chart of a signal outputted from a phase adjustment circuit of the angular velocity signal detection circuit shown in FIG. 3 and FIG. 4.

As shown in FIG. 6, in the first phase adjustment circuit 33 and the second phase adjustment circuit 34, adjustments to make coincidences of amplitude shifts and phase shifts between the first detection signal S1 outputted from the first detection electrode 21 and the second detection signal S2 outputted from the second detection electrode 22 are performed.

Figure 7:
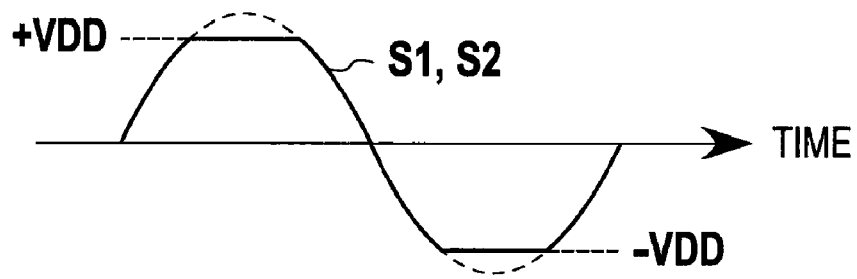
FIG. 7(A), FIG. 7(B) and FIG. 7(C) are waveform charts of signals outputted from amplifier-limiter circuit of the angular velocity signal detection circuit shown in FIG. 3 and FIG. 4.
Figure 7:
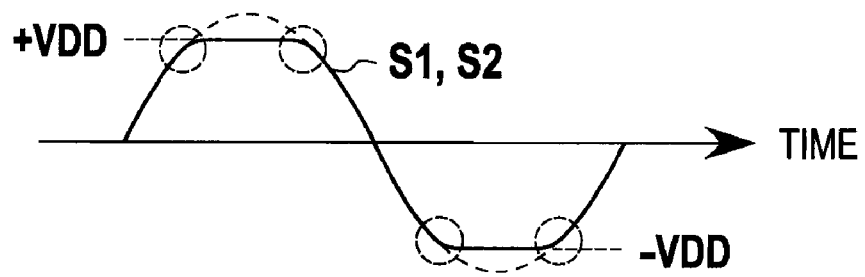
Figure 7:
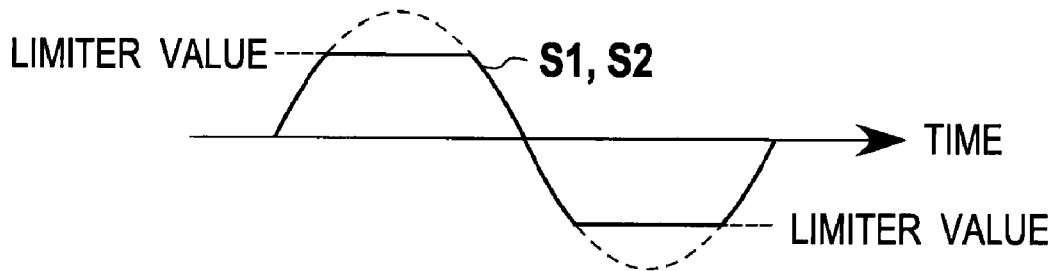

As shown in FIG. 7(A), in the first amplifier-limiter circuit 35, the first detection signal S1 outputted from the first phase adjustment circuit 33 is amplified. In usual, the first detection signal S1 is amplified by the operational amplifier 351 in response to the power supply voltage VDD and the power supply voltage −VDD. As shown in FIG. 7(B), in actual, when the first detection signal S1 is amplified and saturated, the distortion (roundness) occurs as surrounded by each broken line.

Accordingly, in the first amplifier-limiter circuit 35, as shown in FIG. 7(C), by the limiter function, the amplification of the first detection signal S1 is stopped before the first detection signal S1 is saturated so that the distortion cannot occur in the output waveform of the first detection signal S1. In other words, the amplification of the first detection signal S1 is limited before the saturation thereof. Specifically, the amplification of the first detection signal S1 is limited before the saturation thereof by the value division generated by the divider resistance of the resistor 356 and the resistor 357 between the output of the operational amplifier 351 and the power supply voltage VDD, and by the limiter value generated by the resistance division of the resistor 358 and the resistor 359 between the output of the operational amplifier 351 and the power supply voltage −VDD.

In a similar way, in the second amplifier-limiter circuit 36, by the limiter function, the amplification of the second detection signal S2 is stopped before the second detection signal S2 is saturated so that the distortion cannot occur in the output waveform of the second detection signal S2. In other words, the amplification of the second detection signal S2 is limited before the saturation thereof. Specifically, the amplification of the second detection signal S2 is limited before the saturation thereof by the limiter value generated by the resistance division of the resistor 366 and the resistor 367 between the output of the operational amplifier 361 and the power supply voltage VDD, and by the limiter value generated by the resistance division of the resistor 368 and the resistor 369 between the output of the operational amplifier 361 and the power supply voltage −VDD.

Figure 8:
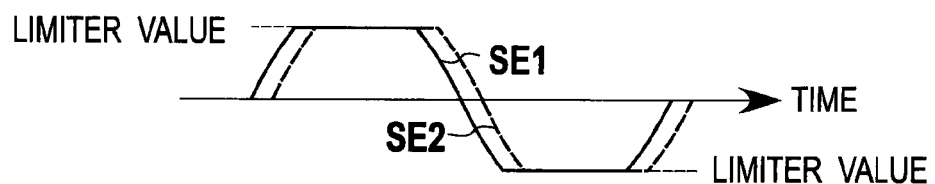
FIG. 8 is a waveform chart of signals inputted to a difference amplifier circuit of the angular velocity signal detection circuit shown in FIG. 3 and FIG. 4.
Figure 9:
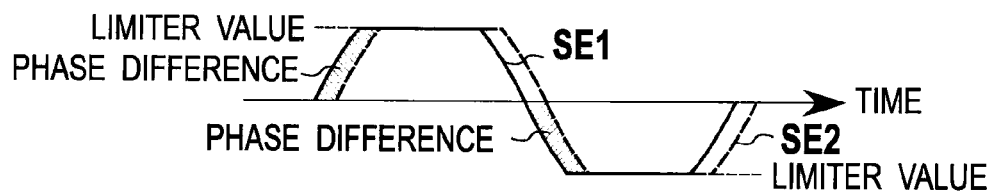
FIG. 9 is a waveform chart of a signal outputted from the difference amplifier circuit of the angular velocity signal detection circuit shown in FIG. 3 and FIG. 4.

As shown in FIG. 8, the first amplification signal SE1 as the first detection signal S1 amplified by the first amplifier-limiter circuit 35 before the saturation and the second amplification signal SE2 as the second detection signal S2 amplified by the second amplifier-limiter circuit 36 before the saturation are inputted to the difference amplifier circuit 37. In the difference amplifier circuit 37, as shown in FIG. 9, the phase difference between the first amplification signal SE1 and the second amplification signal SE2 is extracted, and the extracted phase difference is amplified and outputted. This output is an output signal of the angular velocity signal detection circuit 1A.

In the angular velocity signal detection circuit 1A and the angular velocity signal detection method, which are configured as described above, the detection signals outputted from the gyroscope 2 are amplified without causing the distortion before the saturation of the signal waveforms in the first amplifier-limiter circuit 35 and the second amplifier-limiter circuit 36. Then, the difference amplifier circuit 37 takes out and amplifies the phase difference between the amplified detection signals. As a result, the angular velocity signal detection circuit 1A and the angular velocity signal detection method, which are capable of detecting the angular velocity signal with the minute signal amount easily, can be provided.

(Other Embodiments)

As described above, the present invention has been described based on the first and second embodiments; however, the description and the drawings, which form a part of this disclosure, do not limit this invention. For example, the present invention is not limited only to the angular velocity signal detection circuit 1 and the angular velocity signal detection method, which are used in the thin film vibration gyroscope 2, and can also be applied to an angular velocity signal detection circuit 1 and angular velocity signal detection method of a gyroscope of any of a tuning fork type, a plate type and a ring type.

As described above, the present invention incorporates a variety of embodiments and the like, which are not described herein. Hence, the technical scope of the present invention is defined only by items specifying the invention, which are according to the scope of claims reasonable from the above description.

INDUSTRIAL APPLICABILITY

The angular velocity signal detection circuit and angular velocity signal detection method of the present invention are usable for the electronic instrument industry including the manufacturing industry of manufacturing the gyroscope.

The invention claimed is:

1. An angular velocity signal detection circuit comprising:
    a first current-voltage conversion circuit configured to convert a current outputted from a first detection electrode of a gyroscope into a first voltage, and to amplify the first voltage, to thereby output a first conversion signal;
    a second current-voltage conversion circuit configured to convert a current outputted from a second detection electrode of the gyroscope into a second voltage, and to amplify the second voltage, to thereby output a second conversion signal;
    an arithmetic operation unit configured to perform arithmetic operations by using the first conversion signal and the second conversion signal, and to output a first processing signal and a second processing signal; and
    a difference arithmetic operation circuit configured to amplify a difference between the first processing signal and the second processing signal, to thereby output a signal indicative of angular velocity.

2. The angular velocity signal detection circuit of claim 1, wherein the arithmetic operation unit comprises:
    an adding circuit configured to add the second conversion signal to the first conversion signal, and generate a reference signal;
    a first difference arithmetic operation circuit configured to generate a first difference signal by a difference arithmetic operation between the first conversion signal and the reference signal, and output the first difference signal as the first processing signal; and
    a second difference arithmetic operation circuit configured to generate a second difference signal by a difference arithmetic operation between the second conversion signal and the reference signal, and output the second difference signal as the second processing signal.

3. The angular velocity signal detection circuit of claim 2, further comprising:
    a phase shift circuit configured to generate a timing signal for synchronous detection from the reference signal;
    a synchronous detection circuit configured to synchronize an alternating current signal outputted from the difference arithmetic operation circuit with the timing signal, and convert the alternating current signal into a direct current signal; and
    a direct current amplifier circuit configured to amplify the direct current signal outputted from the synchronous detection circuit.

4. The angular velocity signal detection circuit of claim 1, further comprising a drive circuit connected to a drive electrode of the gyroscope.

5. The angular velocity signal detection circuit of claim 1, wherein the arithmetic operation unit comprises:
    a first amplifier-limiter circuit configured to amplify the first conversion signal up to before saturation of the first conversion signal, to thereby generate a first amplification signal, and output the first amplification signal as the first processing signal; and
    a second amplifier-limiter circuit configured to amplify the second conversion signal up to before saturation of the second conversion signal, to thereby generate a second amplification signal, and output the second amplification signal as the second processing signal.

6. The angular velocity signal detection circuit of claim 5, further comprising:
    a first phase adjustment circuit arranged between the first current-voltage conversion circuit and the first amplifier-limiter circuit, the first phase adjustment circuit adjusting a shift between a phase of the first detection signal outputted from the first detection electrode and a phase of the second detection signal outputted from the second detection electrode; and a second phase adjustment circuit arranged between the second current-voltage conversion circuit and the second amplifier-limiter circuit, the second phase adjustment circuit adjusting a shift between the phase of the first detection signal and the phase of the second detection signal.

7. An angular velocity signal detection method comprising:

converting a current outputted from a first detection electrode of a gyroscope into a first voltage, and amplifying the first voltage, thereby generating a first conversion signal;

converting a current outputted from a second detection electrode of the gyroscope into a second voltage, and amplifying the second voltage, thereby generating a second conversion signal;

performing arithmetic operations by using the first conversion signal and the second conversion signal, and generating a first processing signal and a second processing signal; and amplifying a difference between the first processing signal and the second processing signal, thereby generating an output signal indicative of angular velocity.

8. The angular velocity signal detection method of claim 7, wherein performing the arithmetic operations by using the first conversion signal and the second conversion signal comprises:

adding the first conversion signal and the second conversion signal to each other, and generating a reference signal;

generating a first difference signal by a difference arithmetic operation between the first conversion signal and the reference signal, and outputting the first difference signal as the first processing signal; and generating a second difference signal by a difference arithmetic operation between the second conversion signal and the reference signal, and outputting the second difference signal as the second processing signal.

9. The angular velocity signal detection method of claim 7, wherein performing the arithmetic operations by using the first conversion signal and the second conversion signal comprises:

amplifying the first conversion signal up to before saturation of the first conversion signal, thereby generating a first amplification signal, and outputting the first amplification signal as the first processing signal; and amplifying the second conversion signal up to before saturation of the second conversion signal, thereby generating a second amplification signal, and outputting the second amplification signal as the second processing signal.

* * * * *